(12) United States Patent
Suzuki et al.

(10) Patent No.: US 6,173,102 B1
(45) Date of Patent: Jan. 9, 2001

(54) COATED OPTICAL FIBER AND ITS MANUFACTURING METHOD

(75) Inventors: Atsushi Suzuki; Nobuhiro Akasaka; Yasuo Matsuda, all of Yokohama (JP)

(73) Assignee: Sumitomo Electric Industries, Ltd., Osaka (JP)

( * ) Notice: Under 35 U.S.C. 154(b), the term of this patent shall be extended for 0 days.

(21) Appl. No.: 09/341,796

(22) PCT Filed: Jan. 19, 1998

(86) PCT No.: PCT/JP98/00155

§ 371 Date: Jul. 19, 1999

§ 102(e) Date: Jul. 19, 1999

(87) PCT Pub. No.: WO98/31641

PCT Pub. Date: Jul. 23, 1998

(30) Foreign Application Priority Data

Jan. 20, 1997 (JP) .................................................. 9-007769

(51) Int. Cl.⁷ ...................................................... G02B 6/22
(52) U.S. Cl. ............................................. 385/128; 385/126
(58) Field of Search ................................... 385/128, 126, 385/123

(56) References Cited

U.S. PATENT DOCUMENTS

| | | | |
|---|---|---|---|
| 5,146,531 | * 9/1992 | Shustack | 385/128 |
| 5,352,712 | * 10/1994 | Shustack | 385/123 |
| 5,416,880 | * 5/1995 | Edwards et al. | 385/128 |
| 5,664,041 | * 9/1997 | Szum | 385/128 |
| 6,018,605 | * 1/2000 | Mills et al. | 385/128 |

FOREIGN PATENT DOCUMENTS

| | | |
|---|---|---|
| 646 552 | 4/1995 | (EP) . |
| 62-54206 | 3/1987 | (JP) . |
| 1-166011 | 6/1989 | (JP) . |
| 1-276105 | 11/1989 | (JP) . |
| 7-168069 | 7/1995 | (JP) . |

* cited by examiner

*Primary Examiner*—Jon Henry
(74) *Attorney, Agent, or Firm*—Pillsbury Madison & Sutro LLP

(57) ABSTRACT

A coated optical fiber comprising a glass fiber constituted by a silica based glass core and cladding; and a primary coating and a secondary coating which are formed by photo-curing a primary coating resin layer and a secondary coating resin layer which are applied to an outer periphery of the glass fiber, wherein a maximum value $A_{s(max)}$ of absorbances $A_s$ of the secondary coating resin layer before curing with respect to light in a wavelength region of 310 to 340 nm is not more than 0.5, whereas absorbances $A_p$ of the primary coating resin layer before curing with respect to light in this wavelength region are greater than the absorbances $A_s$.

9 Claims, 4 Drawing Sheets

COATED OPTICAL FIBER AND ITS MANUFACTURING METHOD

TECHNICAL FIELD

The present invention relates to an optical fiber coated with double photo-curable resin layers, and a method of making the same.

BACKGROUND ART

From the viewpoint of low transmission loss, silica based glass fibers have been used as optical fibers for long-distance transmission. In order to keep transmission and strength characteristics, employed is a coated optical fiber in which a primary coating made of a relatively soft resin and a secondary coating made of a relatively hard resin are applied to the surface of a glass fiber.

Conventionally used is a coated optical fiber in which, at the same time when a glass fiber is drawn from an optical fiber preform, a primary coating resin is applied thereto and cured thereon so as to form a primary coating, and then a secondary coating resin is applied to and cured on the outer periphery of the primary coating so as to form a secondary coating. On the other hand, recently has been studied from the viewpoint of improving productivity is a method in which both primary and secondary coating resins are simultaneously applied to the outer periphery of the glass fiber and are subsequently cured. In the case where such a collective coating method is employed, since the power of a light source for irradiating ultraviolet rays is limited, it has been difficult for the primary coating layer to cure sufficiently, thereby making it problematic in that the manufacturing speed is rather lowered.

In order to avoid such a problem, for example, in the collective coating method such as that mentioned above, proposed is a technique in which a photo-polymerization initiator added to the secondary coating resin is relatively lowered (Japanese Patent Application Laid-Open Gazette No. Hei. 7-168069), or a technique in which the primary coating resin and secondary coating resin are cured with their respective curing wavelength bands shifted from each other (Japanese Patent Application Laid-Open Gazette No. Hei. 1-276105).

In the former of the conventional techniques mentioned above, however, when the amount of photo-polymerization initiator added to the secondary coating resin is lowered in order to cure the primary coating resin, the curing speed of the secondary coating decreases, whereby it may become problematic in that productivity deteriorates. In the latter technique, on the other hand, it is hard to obtain resins which clearly demarcate two curing wavelength bands, thus leaving a problem to cure two resin layers efficiently.

It is an object of the present invention to provide a coated optical fiber in which not only the secondary coating resin layer but also the primary coating resin layer can be photo-cured simultaneously and efficiently to a high degree of cure, without relatively lowering the photo-polymerization initiator added to the secondary coating resin or without shifting the curing wavelength bands of primary and secondary coating resins from each other; and a method of making the same.

DISCLOSURE OF THE INVENTION

The coated optical fiber in accordance with the present invention is a coated optical fiber comprising a glass fiber constituted by a silica based glass core and cladding; and a primary coating (inner coating) and a secondary coating (outer coating) which are formed by photo-curing a primary coating resin layer (inner coating resin) and a secondary coating resin layer (outer coating resin) which are applied to an outer periphery of the glass fiber, wherein a maximum value $A_{s(max)}$ of absorbances $A_s$ of the secondary coating resin layer before curing with respect to light in a wavelength region of 310 to 340 nm is not more than 0.5, whereas absorbances $A_p$ of the primary coating resin layer before curing with respect to light in the above-mentioned wavelength region are greater than the absorbances $A_s$.

The inventors have found it is necessary to satisfy the above-mentioned relationship in an optical fiber in which the primary coating and secondary coating are formed around the outer periphery of a glass fiber, in order to photo-cure not only the secondary coating resin layer but also the primary coating resin layer simultaneously and efficiently to a high degree of cure.

That is, conventionally, in the step of curing the above-mentioned two resin layers, as the manufacturing speed increases, though the secondary coating resin is cured, an uncured state has been likely to appear in the primary coating resin. The inventors have considered it attributable to the fact that, when ultraviolet rays are incident on a photo-curable resin, though an energy sufficient for curing the resin is supplied to its surface, the ultraviolet rays are attenuated as they further infiltrate into the resin, thus failing to supply a sufficient energy to the inner photo-curable resin for curing. When an uncured state occurs in the primary coating portion, the interface between the glass fiber and primary coating becomes unstable, whereby transmission characteristics may fluctuate or chemical characteristics of the resin are likely to change, thus deteriorating the reliability as a transmission medium.

The first requirement in the present invention is to use, as a secondary coating resin layer, a photo-curable resin layer of which a maximum value $A_{s(max)}$ of absorbances $A_s$ with respect to light in a wavelength region of 310 to 340 nm is 0.5 or less. Since the maximum value $A_{s(max)}$ of absorbances $A_s$ of the secondary coating resin layer is not more than 0.5 and thus is small, without the ultraviolet rays irradiated for curing being attenuated by absorption within the secondary coating resin, an energy sufficient for curing is supplied to the primary coating resin as well.

Further, in the present invention, as the second requirement, absorbances $A_p$ of the primary coating resin layer with respect to light in the above-mentioned wavelength region are set greater than the absorbances $A_s$ of the secondary coating resin layer, preferably with a difference therebetween of at least 0.3. Since the absorbances $A_p$ of the primary coating resin are higher than the absorbances $A_s$ of the secondary coating resin layer, even when the ultraviolet rays are attenuated by the secondary coating resin, those incident on the primary coating resin can be effectively utilized, thus sufficiently helping the primary coating resin to cure.

The method of making a coated optical fiber in accordance with the present invention comprises:

a first step of preparing a primary coating resin and a secondary coating resin such that a maximum value $A_{s(max)}$ of absorbances $A_s$ of a secondary coating resin layer before curing with respect to light in a wavelength region of 310 to 340 nm is not more than 0.5, whereas absorbances $A_p$ of a primary coating resin layer before curing with respect to light in the above-mentioned wavelength region are greater than the absorbances $A_s$;

a second step of simultaneously applying the primary coating resin layer and the secondary coating resin layer to an outer periphery of a glass fiber constituted by a silica based glass core and cladding; and a third step of photo-curing the primary coating resin layer and the secondary coating resin layer so as to yield the coated optical fiber.

The manufacturing method in accordance with the present invention is a method in which double photo-curable resin layers are collectively applied to the outer periphery of the glass fiber at first, and then these resin layers are cured upon one shot of light irradiation. As such a method is employed, the productivity improves, and the equipment space can be reduced, thus making it possible to reduce the manufacture cost.

Further, since a resin layer of which the maximum value $A_{s(max)}$ of absorbances $A_s$ with respect to light in the wavelength region of 310 to 340 nm is 0.5 or less is used as the secondary coating resin layer, the ultraviolet rays can efficiently enter into the primary coating resin, whereby a sufficient degree of cure can be secured in the primary coating resin.

Also, since the absorbances $A_p$ of the primary coating resin layer with respect to light in the above-mentioned wavelength region is made greater than the absorbances $A_s$ of the secondary coating resin layer, preferably with a difference therebetween of 0.3 or more, the ultraviolet rays incident on the primary coating resin can be effectively utilized, whereby the primary coating resin is effectively cured without lowering the manufacturing speed.

Here, "absorbance A" is one of values indicating a degree at which a resin layer absorbs light, also known as optical density, which is represented by the following expression:

$$A = \log_{10}(I_0/I)$$

wherein $I_0$ and $I$ indicate incident light intensity and transmitted light intensity, respectively.

Though such "absorbance A" may be directly measured by use of a self-recording type spectrophotometer when a thin layer resin sample having a thickness of an actual resin layer (e.g., primary coating resin layer: 37.5 μm, secondary coating resin layer: 20 μm) prepared beforehand is irradiated with light in the wavelength region of 310 to 340 nm, it may be determined by the following method as well. Namely, this method comprises the steps of preparing a standard sample of thin layer resin having a standard thickness (e.g., 100 μm) beforehand, measuring an extinction coefficient (absorbance per unit thickness of resin layer) of this resin from the standard sample, and then calculating the absorbance A from the extinction coefficient and the thickness of the actual resin layer.

The absorbance $A_p$ of the primary coating resin layer and absorbance $A_s$ of the secondary coating resin layer in accordance with the present invention are absorbances with respect to each wavelength within the wavelength region of 310 to 340 nm, respectively. The maximum value of $A_s$ is referred to as $A_{s(max)}$.

For example, in the coated optical fiber of the present invention provided with the primary coating resin layer and secondary coating resin layer exhibiting their respective absorbances shown in FIG. 1, the maximum value $A_{s(max)}$ of absorbances $A_s$ is 0.3, and the minimum value $(A_p - A_s)_{(min)}$ of differences between absorbances $A_p$ and absorbances $A_s$ is 0.25. On the other hand, in the coated optical fiber of the present invention provided with the primary coating resin layer and secondary coating resin layer exhibiting their respective absorbances shown in FIG. 2, the maximum value $A_{s(max)}$ of absorbances $A_s$ is 0.3, and the minimum value $(A_p - A_s)_{(min)}$ of differences between absorbances $A_p$ and absorbances $A_s$ is 0.35.

BEST MODES FOR CARRYING OUT THE INVENTION

In the following, preferred embodiments of the coated optical fiber and method of making the same in accordance with the present invention will be explained in detail with reference to the accompanying drawings.

Figure 1:
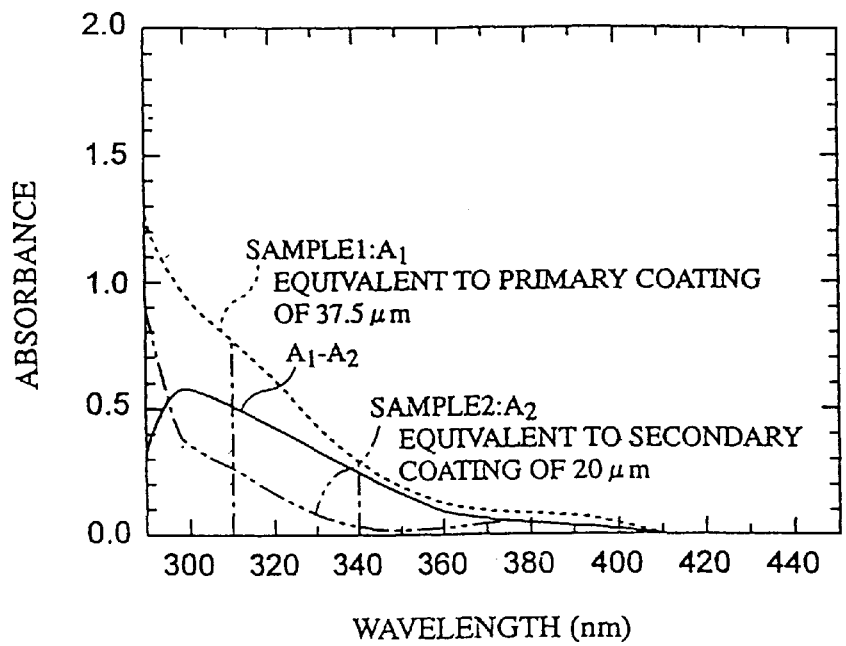
FIG. 1 is a graph showing measured values of absorbance (vs. wavelengths) of each coating resin layer in one embodiment of the coated optical fiber in accordance with the present invention.
Figure 2:
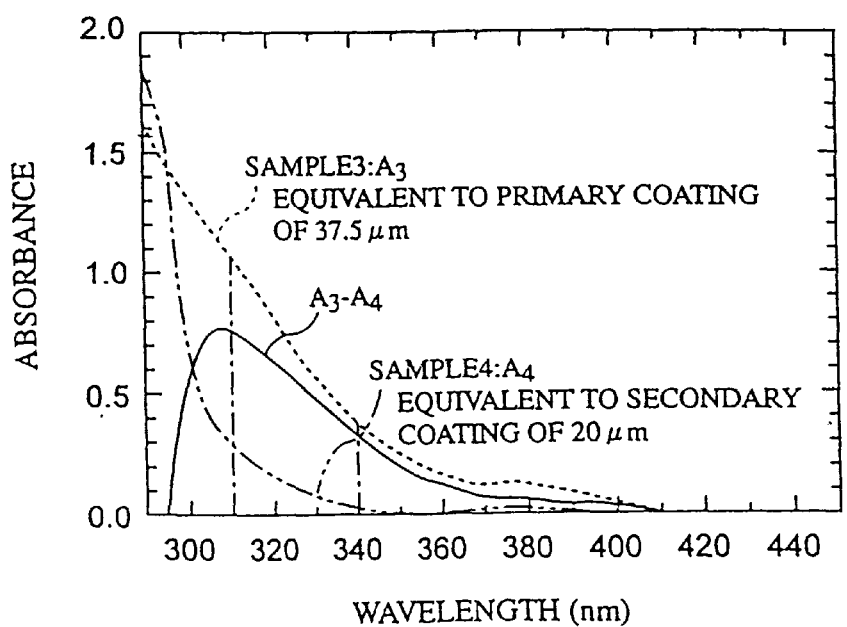
FIG. 2 is a graph showing measured values of absorbance (vs. wavelengths) of each coating resin layer in another embodiment of the coated optical fiber in accordance with the present invention.
Figure 3:
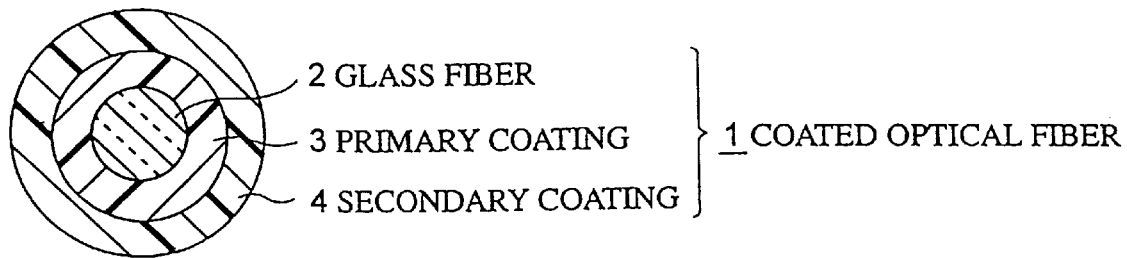
FIG. 3 is a sectional view showing an embodiment of coated optical fiber in accordance with the present invention.

FIG. 3 is a sectional view showing an embodiment of coated optical fiber in accordance with the present invention. A coated optical fiber 1 comprises a drawn silica glass fiber 2, and a primary coating (inner coating) 3 and a secondary coating (outer coating) 4 which are formed by photo-curing a relatively soft primary coating resin layer (inner coating resin) and a relatively hard secondary coating resin layer (outer coating resin) which are simultaneously applied to the outer periphery of the silica glass fiber 2.

Any resin can be used in the present invention as long as it is curable by light (ultraviolet rays). Examples thereof include acrylate based resins of radical polymerization type, polythiol/polyene based resins of photo addition polymerization type, and cation polymerization type resins utilizing a sensitizer which generates a Lewis acid when irradiated with light. Among them, the radical polymerization type resins are preferable since they have a high polymerization speed. Examples of such resins include UV-curable resins of urethane acrylate based, ester acrylate based, ether acrylate based, epoxy acrylate based, butadiene acrylate based, amino resin acrylate based, acrylic resin acrylate based, unsaturated polyester based, and silicone based. Among them, urethane acrylate based resins are preferable since they can yield a wide range of properties from relatively hard ones to relatively soft ones depending on structures of their constituent species while being tough. Though the primary coating resin and secondary coating resin may be respectively made of different kinds of resins, they are preferably made of the same kind of photo-curable resin since peeling at their interface can be prevented more securely.

In general, such a photo-curable resin contains, as its basic constituent ingredients, an oligomer (polymerizable prepolymer) including an unsaturated group (e.g., acryloyl group), a monomer (polymerizable diluent) as a reactive diluent, and a photo-polymerization initiator which absorbs photo-energy and generates active species such as radicals; and may further contain a sensitizer, a filler, a pigment, and the like.

Examples of the above-mentioned oligomer include urethane acrylate (e.g., TDI/βHPA/polyester or polyether), ester acrylate (e.g., phthalic acid/1,6-hexanediol/acrylic acid), ether acrylate, epoxy acrylate, butadiene acrylate, amino resin acrylate (e.g., melamine acrylate), acrylic resin acrylate (e.g., MMA/BA/GMA+AA), unsaturated polyester, and silicone. Such an oligomer can be made from a wide range of materials and, depending on these materials, the physical property of cured product can be designed freely, ranging from soft to hard. For example, in a urethane acrylate in which an oligo-ester (polyester polyol) having a hydroxyl terminal or an oligo-ether (polyether polyol) having a hydroxyl terminal and an acrylate having a hydroxyl group are combined with each other via diisocyanate, a wide range of products having various physical properties can be obtained according to combinations of the selected constituent chemical species (oligo-ester, oligo-ether, and the like).

Examples of the above-mentioned monomer include monofunctional monomers such as 2-ethylhexyl acrylate, ethoxydiethyleneglycol acrylate, phenoxyethyl acrylate, 2-hydroxypropyl acrylate, tetrahydrofurfuryl acrylate, and dicyclopentenyl acrylate; bifunctional monomers such as neopentylglycol diacrylate, 1,6-hexanediol diacrylate, hydroxy pivalic acid neopentylglycol diacrylate, polyethyleneglycol diacrylate, bis(acryloxyethyl) bisphenol A; and multifunctional monomers such as trimethylolpropane triacrylate, pentaerythritol triacrylate, and dipentaerythritol hexaacrylate.

Further, examples of the above-mentioned photo-polymerization initiator include Lucirin TPO (product name, BASF), Irgacure 184 (product name, Ciba Geigy), Irgacure 651 (product name, Ciba Geigy), and Darocure 1173 (product name, Ciba Geigy).

In the photo-curable resin (100% by weight) according to the present invention (the total amount, 100% by weight, of oligomer, monomer, photo-polymerization initiator, and other additives), the content of the oligomer is preferably 20 to 90% by weight, more preferably 20 to 80% by weight, the content of the monomer is preferably 5 to 60% by weight, more preferably 10 to 45% by weight, and the content of the photo-polymerization initiator is preferably 0.2 to 10% by weight, more preferably 0.5 to 5% by weight.

In the coated optical fiber 1 of the present invention, it is necessary for the maximum value $A_{s(max)}$ of absorbances $A_s$ of the secondary coating resin layer before curing to be 0.5 or less with respect to light in the wavelength range of 310 to 340 nm. When the maximum value $A_{s(max)}$ of absorbances $A_s$ of the secondary coating resin layer exceeds 0.5, the ultraviolet rays irradiated for curing are attenuated so much within the secondary coating resin that those entering into the primary coating resin become weak, thus making it difficult for the primary coating to cure sufficiently.

Further, in the coated optical fiber 1 of the present invention, it is necessary for the absorbances $A_p$ of the primary coating resin layer before curing with respect to light in the above-mentioned wavelength range to be greater than the absorbances $A_s$. When the absorbances $A_p$ are greater than the absorbances $A_s$, even when the ultraviolet rays are attenuated by the secondary coating resin, those incident on the primary coating resin are effectively utilized, thus sufficiently helping the primary coating resin to cure. Further, the differences between the absorbances $A_p$ and the absorbances $A_s$ are preferably at least 0.3. When their difference is thus made large, the primary coating resin tends to cure more securely.

The extinction coefficients of the primary coating resin and secondary coating resin before curing with respect to light in the above-mentioned wavelength region are determined according to combinations of constituent chemical species of their selected oligomers (skeletons of oligomers) and employed photo-polymerization initiators. When these extinction coefficients are multiplied by designed coating thickness values of their corresponding resins, the above-mentioned absorbance $A_p$ and absorbance $A_s$ are respectively determined.

Since the extinction coefficients of these resins may increase by on the order of 2% to 4% during curing, it is preferable to chose materials such that the absorbances become lower by on the order of 2% to 4% taking account of the expected increase in extinction coefficient. Namely, a maximum value $A_{s(max)}'$ of absorbances $A_s'$ of the secondary coating resin layer after curing with respect to light in the above-mentioned wavelength region is preferably 0.52 or less, and absorbances $A_p'$ of the primary coating resin layer after curing with respect to light in the above-mentioned wavelength region are preferably greater than the absorbances $A_s'$.

Though not restricted in particular, the thickness (after curing) of each of the primary coating 3 and secondary coating 4 in the coated optical fiber 1 in accordance with the present invention is preferably within the range of about 10 to about 50 μm. When the glass fiber 2 having a diameter of about 125 μm is used, for example, the secondary coating 4 is typically constituted to have an outer diameter on the order of 240 to 250 μm. Here, since the thickness of the resin layers may decrease by on the order of 5% to 50% during curing, in such a case, the thickness of the resin layer before curing is preferably set while taking account of the expected decrease in thickness. Also, from the viewpoint of the lateral pressure resistance characteristic of the resulting coated optical fiber, it is preferred that Young's moduli of the primary coating 3 and secondary coating 4 (after curing) be within the range of about 0.05 to about 0.15 kg /mm² and within the range of about 50 to about 150 kg /mm², respectively.

In the following, a preferred embodiment of the method of making a coated optical fiber in accordance with the present invention will be explained.

Figure 4:
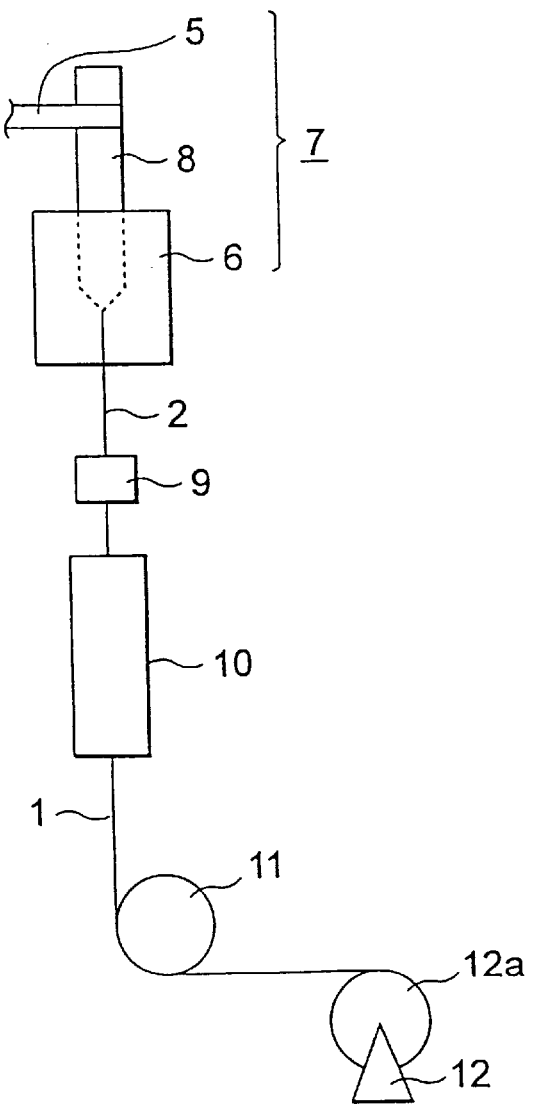
FIG. 4 is a schematic view showing an embodiment of apparatus for making the coated optical fiber in accordance with the present invention.

FIG. 4 is a schematic view showing an embodiment of apparatus for making the coated optical fiber in accordance with the present invention. Disposed in the apparatus shown in FIG. 4 is a drawing unit 7 comprising a preform feeder 5 which is disposed so as to be vertically movable while holding an optical fiber glass preform 8, and a drawing furnace 6 for yielding a glass fiber 2 by heating, melting, and drawing a tip portion of the preform 8 introduced by the feeder 5. Successively arranged below the drawing unit 7 are a collective double coating applicator (device for simultaneously coating two layers) 9 for simultaneously applying a primary coating resin layer 3' and a secondary coating resin layer 4' to the outer periphery of the glass fiber 2; a UV-curing unit 10 for forming a coated optical fiber 1 by irradiating the coated double resin layers with ultraviolet rays; a capstan 11 for pulling the coated optical fiber 1 at a constant speed; and a take-up unit 12 for winding thus pulled coated optical fiber 1 around a drum 12a.

In this apparatus, to the glass fiber 2 drawn from the preform 8 by the drawing furnace 6, the resin layers 3' and 4' respectively forming the primary coating 3 and secondary coating 4 are simultaneously applied by the collective double coating applicator 9, and then the resin layers 3' and 4' are irradiated with ultraviolet rays by the UV-curing unit 10, whereby the double-coated optical fiber 1 is formed. During this period, the preform 8 is gradually fed into the drawing furnace 6 by the feeder 5.

Figure 5A:
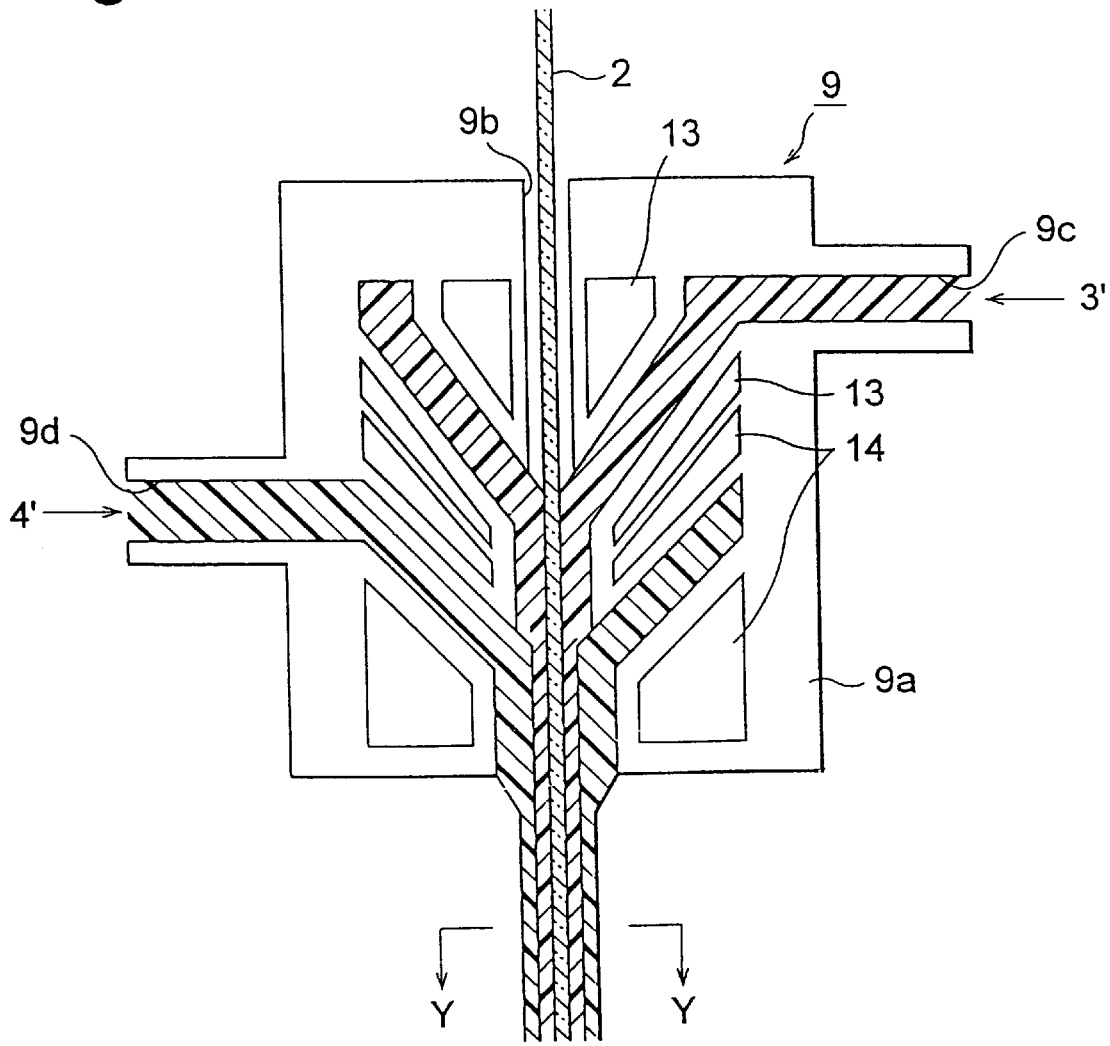
FIG. 5A is a schematic sectional view showing an embodiment of collective double coating applicator suitable for making the coated optical fiber in accordance with the present invention.

FIG. 5A is a vertical sectional view showing an embodiment of the collective double coating applicator 9. In the applicator shown in FIG. 5A, the center part of a cylindrical main body 9a is provided with a through-hole 9b for transmitting the glass fiber 2 therethrough, whereas passages 9c and 9d for respectively introducing the pressurized primary coating resin 3' and secondary coating resin 4' to the outer periphery of the glass fiber 2 from the outside of the main body 9a are formed independently of each other. Disposed around these passages are heaters 13 and 14 for regulating the temperatures of the primary coating resin 3' and secondary coating resin 4', respectively.

When making the coated optical fiber 1 of the present invention, the primary coating resin 3' and the secondary coating resin 4' are prepared such that the maximum value $A_{s(max)}$ of absorbances $A_s$ of the secondary coating resin layer 4' before curing with respect to light in the wavelength region of 310 to 340 nm is 0.5 or less, whereas the absorbances $A_p$ of the primary coating resin layer 3' before curing with respect to light in the above-mentioned wavelength region are greater than the absorbances $A_s$; and, in the collective double coating applicator 9, while their temperatures are respectively adjusted by the heaters 13 and 14, the resins are collectively applied to the outer periphery of the glass fiber 2. Since the primary coating resin 3' and the secondary coating resin 4' are extruded from the coating applicator 9 at their respective predetermined pressures while the glass fiber 2 is pulled at a constant speed, the thickness of the resin to be coated is determined by the amount of extruded resin and the linear velocity of glass fiber.

Figure 5B:
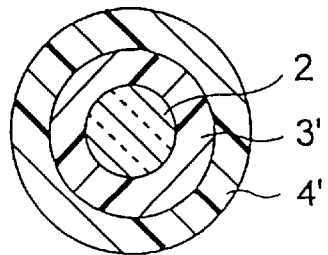
FIG. 5B is a sectional view of an uncured, coated optical fiber simultaneously coated with two resin layers by the applicator shown in FIG. 5A, taken along line Y—Y thereof.

The primary coating resin layer 3' and secondary coating resin layer 4' applied to the outer periphery of the glass fiber 2 as shown in FIG. 5B are irradiated with ultraviolet rays while passing through the center portion of the UV-curing unit 10, whereby curing proceeds in the secondary coating resin layer 4' and the primary coating resin layer 3'. The resulting coated optical fiber 1 is pulled by the capstan 11 and is wound around the drum 12a of the take-up unit 12.

Figure 6:
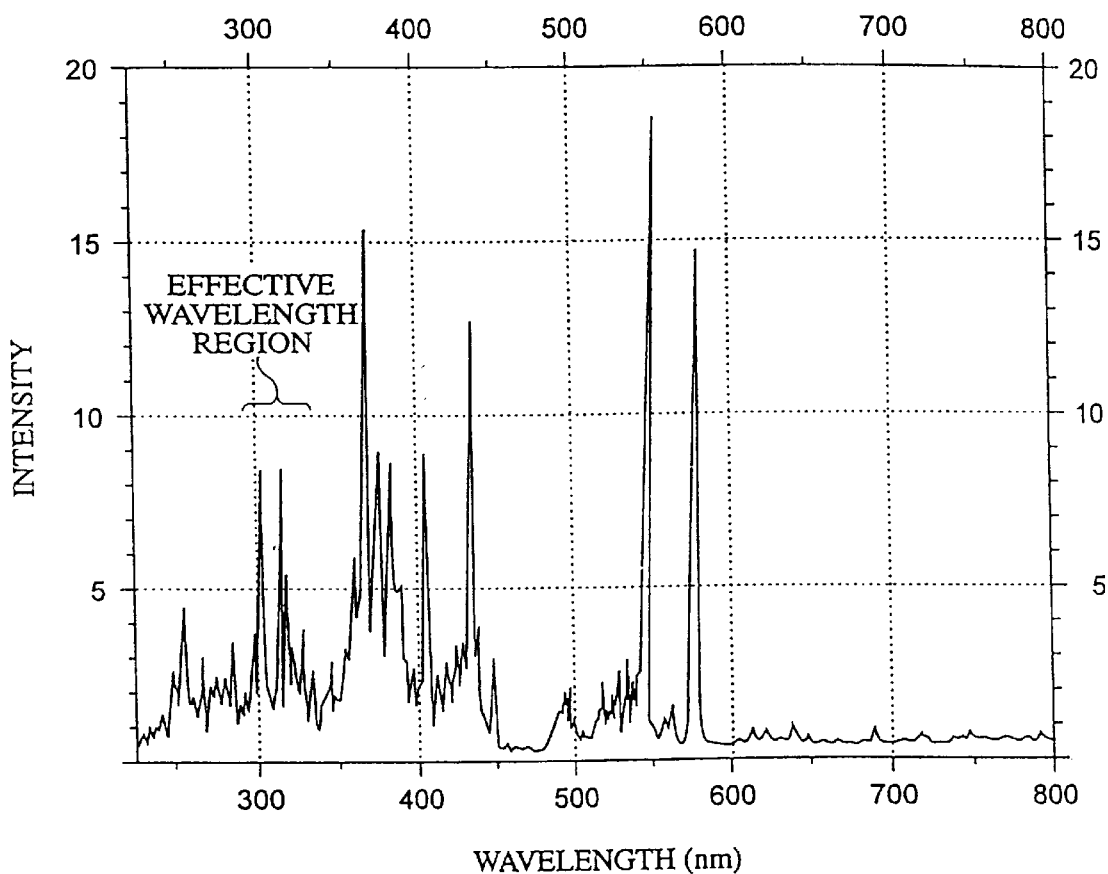
FIG. 6 is a chart showing an example of emission spectrum characteristic of a metal halide lamp.

Preferable as an irradiating light source used in the present invention is a metal halide lamp which can emit ultraviolet rays having a high-intensity spectrum at a wavelength band of 310 to 340 nm as shown in FIG. 6.

EXAMPLES 1 TO 12 AND COMPARATIVE EXAMPLES 1 TO 6

Prepared as the secondary coating resin were hard urethane acrylate based photo-curable resins yielding the maximum values $A_{s(max)}$ of absorbances $A_s$ shown in Tables 1 and 2 with respect to light in the wavelength region of 310 to 340 nm when set to a designed resin thickness (equivalent to 20 μm); whereas prepared as the primary coating resin were soft urethane acrylate based photo-curable resins yielding the minimum values $(A_p-A_s)_{(min)}$ of differences between absorbances $A_p$ and absorbances $A_s$ shown in Tables 1 and 2 when set to a designed thickness (equivalent to 37.5 μm). Here, each of the absorbance $A_p$ and absorbance $A_s$ was determined beforehand by the above-mentioned method.

As a photo-polymerization initiator, Lucirin TPO (product name, BASF) or Irgacure 184 (product name, Ciba Geigy) was used so as to be added to each of the primary coating resin and secondary coating resin by 1% by weight.

Then, by means of the apparatus shown in FIG. 4, at the same time when the primary coating resin having an outer diameter of 200 μm (after curing) was applied to the outer periphery of a silica glass fiber having an outer diameter of 125 μm, its outer periphery was coated with the secondary coating resin having an outer diameter of 240 μm (after curing), and thus coated resins were irradiated with ultraviolet rays so as to be simultaneously cured, thereby yielding a coated optical fiber.

(Manufacturing Condition)

Drawing speed: shown in Tables 1 and 2

Light source: metal halide lamp (120 W/cm type, having a wavelength characteristic shown in FIG. 6)

In each of thus obtained coated optical fibers, gel ratios of the secondary coating resin and primary coating resin after curing were measured. Here, gel ratio refers to an index indicating the extent of curing in a resin, which is represented by:

gel ratio=(W/W₀)×100 (%)

wherein $W_0$ is an initial weight of a coating, and W is a weight of the coating after its ungelled component is extracted with a solvent. The gel ratio of the resin employed as a coating layer of a coated optical fiber is preferably as high as possible, and is desired to be 90% or higher.

The results thus obtained are shown in Tables 1 and 2. Here, the cases where the gel ratio of the primary coating resin after curing is 92% or higher, at least 90% but less than 92%, and less than 90% are respectively indicated by degrees of cure ⊚, ○, and x.

TABLE 1

| Example/ Comparative Example | Photo-curing initiator | Manufacturing linear velocity (m/min) | Absorbance (310–340 nm) As(max) | Absorbance (310–340 nm) (Ap-As)(min) | Gel ratio (%) Secondary coating resin | Gel ratio (%) Primary coating resin | Degree of cure |
|---|---|---|---|---|---|---|---|
| Ex.1 | Lucirin TPO | 400 | 0.3 | 0.1 | 95.3 | 90.2 | ○ |
| Ex.2 | Lucirin TPO | 400 | 0.3 | 0.2 | 95.2 | 91.0 | ○ |
| Ex.3 | Lucirin TPO | 400 | 0.3 | 0.5 | 95.2 | 93.4 | ⊚ |
| Ex.4 | Lucirin TPO | 400 | 0.5 | 0.1 | 95.3 | 90.1 | ○ |
| Ex.5 | Lucirin TPO | 400 | 0.5 | 0.2 | 95.1 | 90.5 | ○ |

TABLE 1-continued

| Example/ Comparative Example | Photo-curing initiator | Manufacturing linear velocity (m/min) | Absorbance (310–340 nm) | | Gel ratio (%) | | Degree of cure |
|---|---|---|---|---|---|---|---|
| | | | As(max) | (Ap-As)(min) | Secondary coating resin | Primary coating resin | |
| Ex.6 | Lucirin TPO | 400 | 0.5 | 0.3 | 95.2 | 92.3 | ⊙ |
| Comp.Ex.1 | Lucirin TPO | 400 | 0.8 | −0.3 | 95.4 | 79.1 | X |
| Comp.Ex.2 | Lucirin TPO | 400 | 0.8 | 0.1 | 95.2 | 81.5 | X |
| Comp.Ex.3 | Lucirin TPO | 400 | 0.8 | 0.2 | 95.1 | 82.1 | X |

TABLE 2

| Example/ Comparative Example | Photo-curing initiator | Manufacturing linear velocity (m/min) | Absorbance (310–340 nm) | | Gel ratio (%) | | Degree of cure |
|---|---|---|---|---|---|---|---|
| | | | As(max) | (Ap-As)(min) | Secondary coating resin | Primary coating resin | |
| Ex.7 | Irgacure 184 | 300 | 0.3 | 0.1 | 95.3 | 90.1 | ○ |
| Ex.8 | Irgacure 184 | 300 | 0.3 | 0.2 | 95.2 | 90.6 | ○ |
| Ex.9 | Irgacure 184 | 300 | 0.3 | 0.4 | 95.2 | 92.9 | ⊙ |
| Ex.10 | Irgacure 184 | 300 | 0.5 | 0.1 | 95.3 | 90.2 | ○ |
| Ex.11 | Irgacure 184 | 300 | 0.5 | 0.2 | 95.1 | 90.7 | ○ |
| Ex.12 | Irgacure 184 | 300 | 0.5 | 0.3 | 95.2 | 92.5 | ⊙ |
| Comp.Ex.4 | Irgacure 184 | 300 | 0.8 | −0.6 | 95.3 | 78.7 | X |
| Comp.Ex.5 | Irgacure 184 | 300 | 0.8 | −0.1 | 95.2 | 80.6 | X |
| Comp.Ex.6 | Irgacure 184 | 300 | 0.8 | 0.1 | 95.4 | 82.9 | X |

The measured results shown in Tables 1 and 2 have clarified the following. Namely, as can be seen from the results of Comparative Examples 1 to 6, when the maximum value $A_{s(max)}$ of absorbances $A_s$ of the secondary coating resin layer exceeds 0.5, the gel ratio of the primary coating resin is so low that the degree of cure becomes insufficient. It seems to be due to the fact that the ultraviolet rays are attenuated while passing through the secondary coating resin. By contrast, as indicated by the results of Examples 1 to 12, when the maximum value $A_{s(max)}$ of absorbances $A_s$ of the secondary coating resin layer is 0.5 or less, not only the secondary coating resin but also the primary coating resin can be cured sufficiently.

Also, as can be seen from the results of Examples 1 to 3, 4 to 6, 7 to 9, and 10 to 12, in the case where the maximum value $A_{s(max)}$ of absorbances $A_s$ of the secondary coating resin layer is 0.5 or less, when the absorbances $A_p$ of the primary coating resin layer are greater than the absorbances $A_s$ of the secondary coating resin layer, the degree of cure of the primary coating resin can be enhanced sufficiently. In particular, when their differences are 0.3 or more, not only the secondary coating resin but also the primary coating resin can be cured substantially completely.

INDUSTRIAL APPLICABILITY

As explained in the foregoing, in accordance with the coated optical fiber of the present invention, without relatively lowering the photo-polymerization initiator added to the secondary coating resin or without shifting the curing wavelength bands of primary and second coating resins from each other, not only the secondary coating resin layer but also the primary coating resin layer can be photo-cured simultaneously and efficiently to a high degree of cure. Accordingly, the coated optical fiber of the present invention has a high productivity and a high reliability.

Also, in accordance with the method of the present invention, the above-mentioned coated optical fiber in accordance with the present invention can be made efficiently and securely.

What is claimed is:

1. A coated optical fiber comprising a glass fiber constituted by a silica based glass core and cladding; and a primary coating and a secondary coating which are formed by photo-curing a primary coating resin layer and a secondary coating resin layer which are applied to an outer periphery of said glass fiber,
wherein a maximum value $A_{s(max)}$ of absorbances $A_s$ of said secondary coating resin layer before curing with respect to light in a wavelength region of 310 to 340 nm is not more than 0.5, whereas absorbances $A_p$ of said primary coating resin layer before curing with respect to light in said wavelength region are greater than said absorbances $A_s$.

2. A coated optical fiber according to claim 1, wherein said absorbances $A_p$ are greater than said absorbances $A_s$ by at least 0.3.

3. A coated optical fiber according to claim 1, wherein a maximum value $A_{s(max)}'$ of absorbances $A_s'$ of said secondary coating resin layer after curing with respect to light in said wavelength region is not greater than 0.52, whereas absorbances $A_p'$ of said primary coating resin layer after curing with respect to light in said wavelength region are greater than said absorbances $A_s'$.

4. A coated optical fiber according to claim 1, wherein each of said primary coating and secondary coating after curing has a thickness of about 10 to about 50 $\mu$m, and wherein said primary coating resin and secondary coating resin after curing have Young's moduli within a range of about 0.05 to about 0.15 kg/mm$^2$ and within a range of about 50 to about 150 kg/mm$^2$, respectively.

5. A method of making the coated optical fiber according to claim 1, said method comprising:

a first step of preparing a primary coating resin and a secondary coating resin such that a maximum value $A_{s(max)}$ of absorbances $A_s$ of a secondary coating resin layer before curing with respect to light in a wavelength region of 310 to 340 nm is not more than 0.5, whereas absorbances $A_p$ of a primary coating resin layer before curing with respect to light in said region are greater than said absorbances $A_s$;

a second step of simultaneously applying said primary coating resin layer and said secondary coating resin layer to an outer periphery of a glass fiber constituted by a silica based glass core and cladding; and a third step of photo-curing said primary coating resin layer and said secondary coating resin layer so as to yield said coated optical fiber.

6. A method according to claim 5, wherein said absorbances $A_p$ are greater than said absorbances $A_s$ by at least 0.3.

7. A method according to claim 5, wherein a maximum value $A_{s(max)}'$ of absorbances $A_s'$ of said secondary coating resin layer after curing with respect to light in said wavelength region is not greater than 0.52, whereas absorbances $A_p'$ of said primary coating resin layer after curing with respect to light in said wavelength region are greater than said absorbances $A_s'$.

8. A method according to claim 5, wherein each of said primary coating and secondary coating after curing has a thickness of about 10 to about 50 μm, and wherein said primary coating resin and secondary coating resin after curing have Young's moduli within a range of about 0.05 to about 0.15 kg/mm$^2$ and within a range of about 50 to about 150 kg/mm$^2$, respectively.

9. A method according to claim 5, wherein, in said third step, a metal halide lamp is used to irradiate ultraviolet rays so as to photo-cure said primary coating resin layer and said secondary coating resin layer.

* * * * *